Jan. 24, 1939. J. T. CORLEY 2,144,619
FIRE FIGHTING EQUIPMENT
Filed July 1, 1935 2 Sheets-Sheet 1

Inventor
John T. Corley
By Nathaniel Frucht
his Attorney

Jan. 24, 1939.    J. T. CORLEY    2,144,619
FIRE FIGHTING EQUIPMENT
Filed July 1, 1935    2 Sheets-Sheet 2

Inventor
John T. Corley
By Nathaniel Frucht
his Attorney

Patented Jan. 24, 1939

2,144,619

UNITED STATES PATENT OFFICE 2,144,619

FIRE FIGHTING EQUIPMENT

John T. Corley, Providence, R. I.

Application July 1, 1935, Serial No. 29,293

2 Claims. (Cl. 299—107)

This application is a continuation in part of application Serial No. 439,977 for Nozzle arrangements, filed March 29, 1930.

My present invention relates to fire fighting equipment, and has particular reference to nozzle attachments for hose.

Nozzle attachments for hose have heretofore been designed as units to be attached to a hose by means of a connecting coupling. This construction has rendered it difficult to add hose lengths whenever additional length is necessary, as when a fireman using a nozzle on a ladder finds it advisable to ascend another story or when the length must be extended to reach to another building. The usual procedure in such cases is to shut off the water flow, either by a valve or by hose clamps, remove the nozzle, add a length of hose, and then lock the nozzle to the end of the added hose. Such procedure requires two men, and stops use of the hose for a considerable period of time, since the shut off valves and the hose clamps are usually on the ground at the fire hydrant apparatus. One object of my invention is to facilitate the addition of hose lengths and permit the entire change to be under control of one fireman, without danger of injuring the hose by the use of hose clamps.

In addition, the nozzle attachments, when equipped with shut off valves, have required periodic inspection and replacement of rubber gaskets, particularly when the local water used, the addition of chemicals, or the use of chemical solutions, has a deteriorating effect on the rubber gaskets. A further object of my invention is to provide a valve structure which is easily manufactured and assembled, which has no rubber or other gaskets and is not affected by water conditions and the like, and which requires no replacement of parts during the life of the valve.

Figure 1:
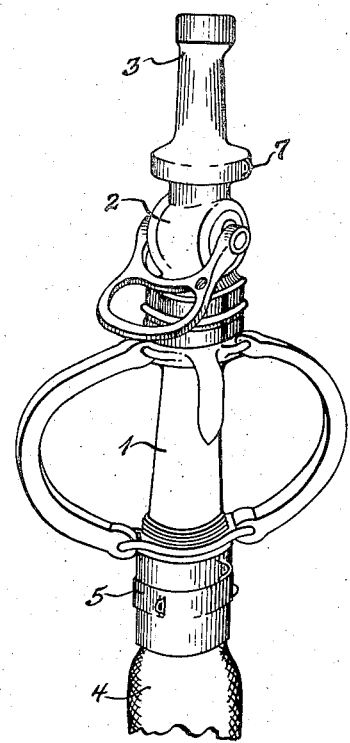
Fig. 1 is a perspective view of the novel nozzle attachment.
Figure 2:
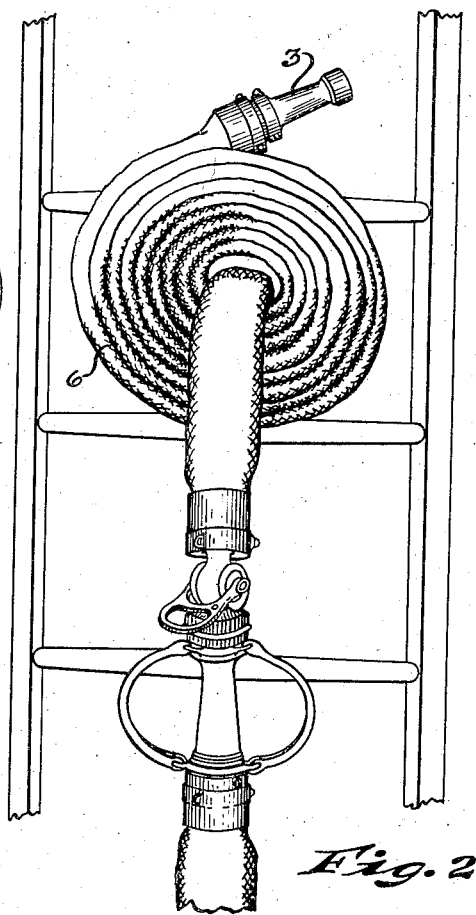
Fig. 2 is a perspective view showing the addition of a length of hose, on a ladder.
Figure 3:
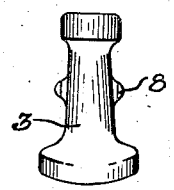
Fig. 3 is an elevation of the nozzle top.

Referring to Figs. 1 to 3 of the drawings, the nozzle attachment includes a nozzle 1, a cut-off valve 2, and a screw tip 3. The nozzle 1 is secured to the hose 4 by a male coupling 5, and has the usual flexible leather handles, secured to the swivel yoke which is mounted on the lower end of the nozzle and the swivel hook ring which is mounted on the upper end of the nozzle.

The nozzle is internally threaded at the lower end, and externally threaded at the upper end with underwriter's standard play-pipe threads, and the valve casing is internally threaded at the lower end to engage the upper end of the nozzle, and externally threaded at the upper end to receive the screw tip 3, which is correspondingly internally threaded at its lower end. The external threads of the valve casing are of standard hose coupling, preferably national standard 2½ inch hose coupling thread, size and pitch, thus permitting direct attachment of an additional hose length 6 to the valve casing, and of the screw tip to the free male end of the hose length, as shown in Fig. 2.

The described nozzle arrangement is therefore of the universal type, since an additional hose length may be readily attached whenever required. Such attachment is easily made by the fireman by shutting the cut-off valve, unscrewing the screw tip, and screwing one end of the additional hose length on the valve casing and the screw tip on the other end; the cut-off valve may now be opened to permit stream flow. The screw tip may have lugs 7 at the base thereof, as shown in Fig. 1, or lugs 8 may be provided in the center portion, if preferred, as shown in Fig. 3.

The described nozzle arrangement therefore facilitates hose control and the addition of hose lengths, is readily manipulated and operated by a single fireman, saves a large proportion of the necessary time for changing, by eliminating any need for returning to the shut-off valves or hydrant valves, and removes all danger of injury to the hose through the use of hose clamps.

Preferably, the internal threads on the valve casing are standard hose coupling threads, the upper end of the nozzle being similarly threaded, so that all parts become interchangeable, and the cut-off valve can be used between two lines of hose as an emergency cut-off.

The shut-off valve

Figure 4:
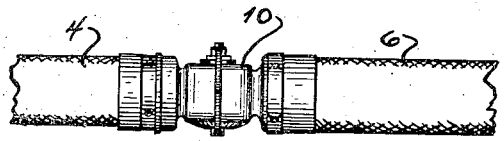
Fig. 4 is a detail disclosing the use of the novel valve as a hose connection.
Figure 5:
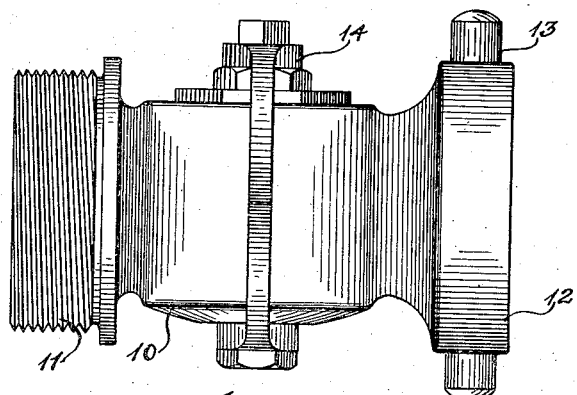
Fig. 5 is a side elevation of the novel valve.
Figure 6:
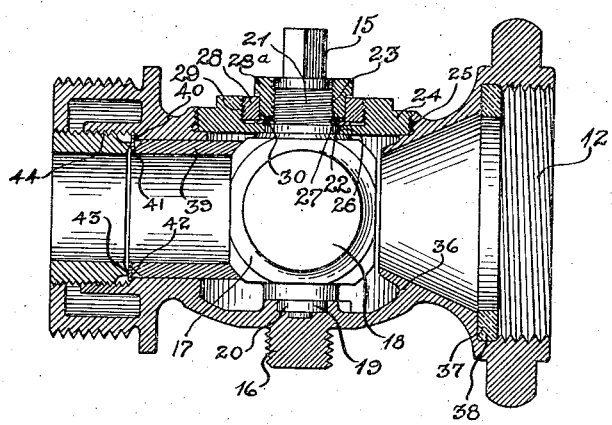
Fig. 6 is a vertical central section thereof.
Figure 7:
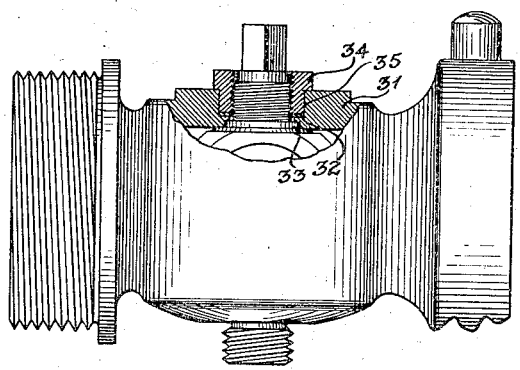
Fig. 7 is a view similar to Fig. 1, but broken away to show a modified bearing packing.

Referring to Figs. 5 to 7 of the drawings, the valve casing 10 has one end 11 threaded with an external standard thread, for example, national standard 2½ inch thread, and the other end 12 threaded with an internal standard thread, preferably the same national standard 2½ inch, this end being provided with shut-off turning lugs 13 of any desired type; a handle 14 is mounted on the squared end 15 of the valve stem and on a threaded boss 16. This construction permits use of the valve as a connection between hose lengths, as shown in Fig. 4.

The valve 17, see Fig. 6, is preferably of the globe type, having a radial port or passageway 18, the sides of the valve being flattened at right angles to the port to facilitate free turning and relieve back pressure, and has one end 19 stepped and rotatably seated in a bearing 20, the stem 21 having a shoulder 22 and a reduced threaded portion 23 which terminates in the squared end 15. A circular bearing plate 24 is threaded into a threaded opening 25 in the valve body, and has a bearing shoulder 26 which contacts the shoulder 22 and has its upper surface in alignment with the upper surface thereof, thus permitting a packing ring 27 to seat over the joint between the two shoulders.

A lock ring 28 threadedly engages internal threads 29 of the bearing plate body so as to grip the outer portion of the packing ring, and a second lock ring 28a is threadedly seated on the stem portion 21, and is movable within the lock ring 28 to grip the inner portion of the packing ring, preferably through an intermediate smaller packing ring 30.

It is thus evident that the novel packing includes a ring which seats over the joint between a valve stem shoulder and a bearing plate shoulder, this ring being independently gripped or held at its concentric inner and outer portions. Since the outer grip is substantially a solid grip, the bearing plate may be formed as indicated at 31 in Fig. 7 with an integral projection 32 contacting the valve stem shoulder and an integral ring 33 seating on the valve stem shoulder, whereby one inner lock ring 34 and one packing ring 35 may seal the joint. Although this construction is simpler, the first described construction is preferred, as it is possible to use a packing ring of a metal different than the bearing plate metal.

The end 12 of the valve has a conical portion 36 serving as an entrance passageway, and has a shoulder 37 for receiving the usual heavy packing ring 38; the end 11 is cylindrically bored to receive a tubular packing cylinder 39 seated on the valve, and has a shoulder 40 which is aligned with a collar 41 on the cylinder 39, this collar being formed by bevelling or tapering the end of the cylinder; a packing ring 42 is seated on the spaced shoulder and at the collar and is locked in place by the annular bead or projection 43 of a lock ring 44 threadedly mounted in the upper portion of the valve end 12. This construction exerts a central pressure on the packing ring and bends the ring transversely to obtain a very effective seal.

While I have described specific details of the structure and arrangement of the novel apparatus, it is evident that changes in the sizes, relative proportions, and relative arrangements of the parts, may be made to suit the requirements for different installations and uses, within the spirit and the scope of the invention as defined in the appended claims.

I claim:

1. In a nozzle arrangement, a nozzle internally threaded at the lower end for connection to a length of hose or the like, a cut-off valve threaded on the upper end of said nozzle, said cut-off valve being externally threaded at its upper end, the external and internal threads on said nozzle and valve being of the same standard size and complementary to each other.

2. In a nozzle arrangement, a nozzle internally threaded at the lower end for connection to a length of hose or the like, a cut-off valve threaded on the upper end of said nozzle, said cut-off valve being externally threaded at its upper end, and a nozzle tip mounted on said external threads, the external and internal threads on said nozzle, valve, and nozzle tip being of the same standard size and complementary to each other.

JOHN T. CORLEY.